US012110789B2

(12) United States Patent
Annenkov et al.

(10) Patent No.: US 12,110,789 B2
(45) Date of Patent: Oct. 8, 2024

(54) ELECTROMAGNETIC DOWNLINK WHILE DRILLING

(71) Applicant: Schlumberger Technology Corporation, Sugar Land, TX (US)

(72) Inventors: Pavel Annenkov, Houston, TX (US); Melisa Lourdes Ramirez Tovar, Sugar Land, TX (US); Robert Tennent, Cambridge, MA (US); Sam Soundar, Katy, TX (US); Jiuping Chen, San Pablo, CA (US); Liang Sun, Katy, TX (US); Richard Hunter, Houston, TX (US); Wei Zhou, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 305 days.

(21) Appl. No.: 17/247,445

(22) Filed: Dec. 11, 2020

(65) Prior Publication Data

US 2021/0180448 A1    Jun. 17, 2021

Related U.S. Application Data

(60) Provisional application No. 62/947,851, filed on Dec. 13, 2019.

(51) Int. Cl.
*E21B 47/13* (2012.01)
*E21B 7/18* (2006.01)
*G01V 3/30* (2006.01)

(52) U.S. Cl.
CPC ............... *E21B 47/13* (2020.05); *E21B 7/18* (2013.01); *G01V 3/30* (2013.01)

(58) Field of Classification Search
CPC .......... E21B 47/13; E21B 7/18; E21B 17/003; G01V 3/24; G01V 3/38; G01V 3/30
See application file for complete search history.

(56) References Cited

U.S. PATENT DOCUMENTS

2020/0291769 A1*    9/2020 Torbett ................. H04B 1/1027

FOREIGN PATENT DOCUMENTS

WO    2018152648 A1    8/2018

OTHER PUBLICATIONS

Liu, C.R., Theory of Electromagnetic Well Logging, Elsevier, ISBN-13: 978-0128040089, 2017, pp. 645-688.

* cited by examiner

*Primary Examiner* — Yong-Suk (Philip) Ro (57) ABSTRACT

Communication between the surface and a downhole location, such as a bottomhole assembly and/or an RSS is performed by electromagnetic downlink. Electromagnetic signals are transmitted from the surface through the formation at a frequency of 8 Hz or greater. Electromagnetic signals are transmitted and received while drilling or during drilling activities. In this manner, information and instructions may be transmitted to the BHA while drilling.

18 Claims, 7 Drawing Sheets

ELECTROMAGNETIC DOWNLINK WHILE DRILLING

CROSS-REFERENCE TO RELATED APPLICATIONS

This application claims priority to and the benefit of U.S. Provisional Application No. 62/947,851, filed on Dec. 13, 2019, the entirety of which is incorporated herein by reference.

BACKGROUND OF THE DISCLOSURE

Underground drilling systems often include one or more downhole tools on a bottomhole assembly (BHA). An operator on the surface may transmit signals to the one or more downhole tools and/or the BHA. In this manner, the user may transmit information and/or instructions to the one or more downhole tools and/or the BHA. To transmit the signals, the operator may generate mud pulses, transmit electromagnetic signals along a conductive wire, transmit electromagnetic signals through the formation.

SUMMARY

In some embodiments, a method for downhole communication includes transmitting an electromagnetic signal from a surface location. The electromagnetic signal is received downhole at a bottomhole assembly while drilling.

In other embodiments, a method for downhole communication includes transmitting an electromagnetic signal from a surface location at a frequency of at least 8 Hz. The electromagnetic signal is received downhole at a bottomhole assembly.

In yet other embodiments, a method for downhole communication include performing drilling activities. While performing the drilling activities, an electromagnetic signal may be transmitted from a surface location. The electromagnetic signal is received at a bottomhole assembly downhole while performing the drilling activities. The electromagnetic signal is demodulated at the bottomhole assembly.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for electromagnetic downlink while drilling communication in drilling systems.

Figure 1:
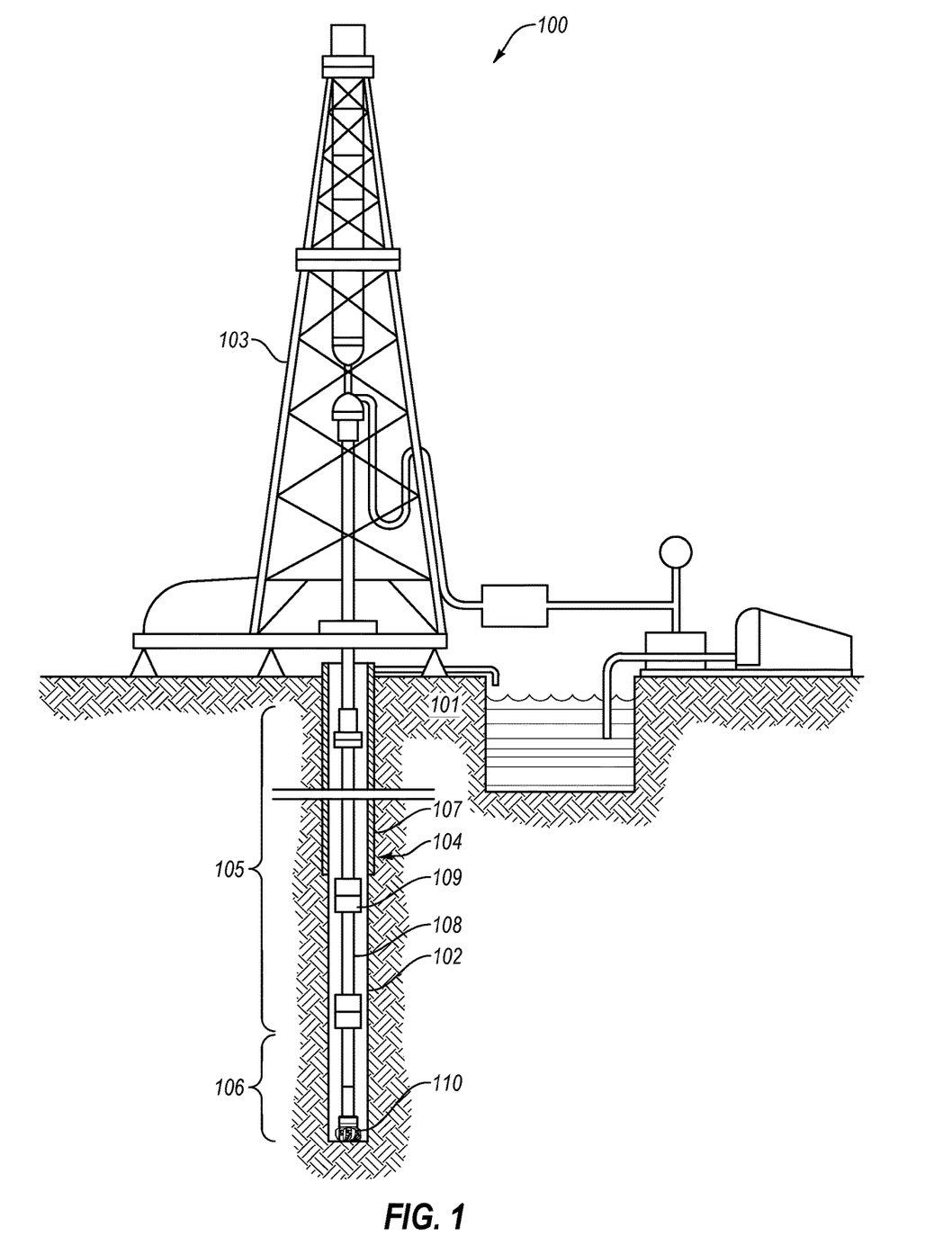
FIG. 1 is a representation of a drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves).

Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

Figure 2:
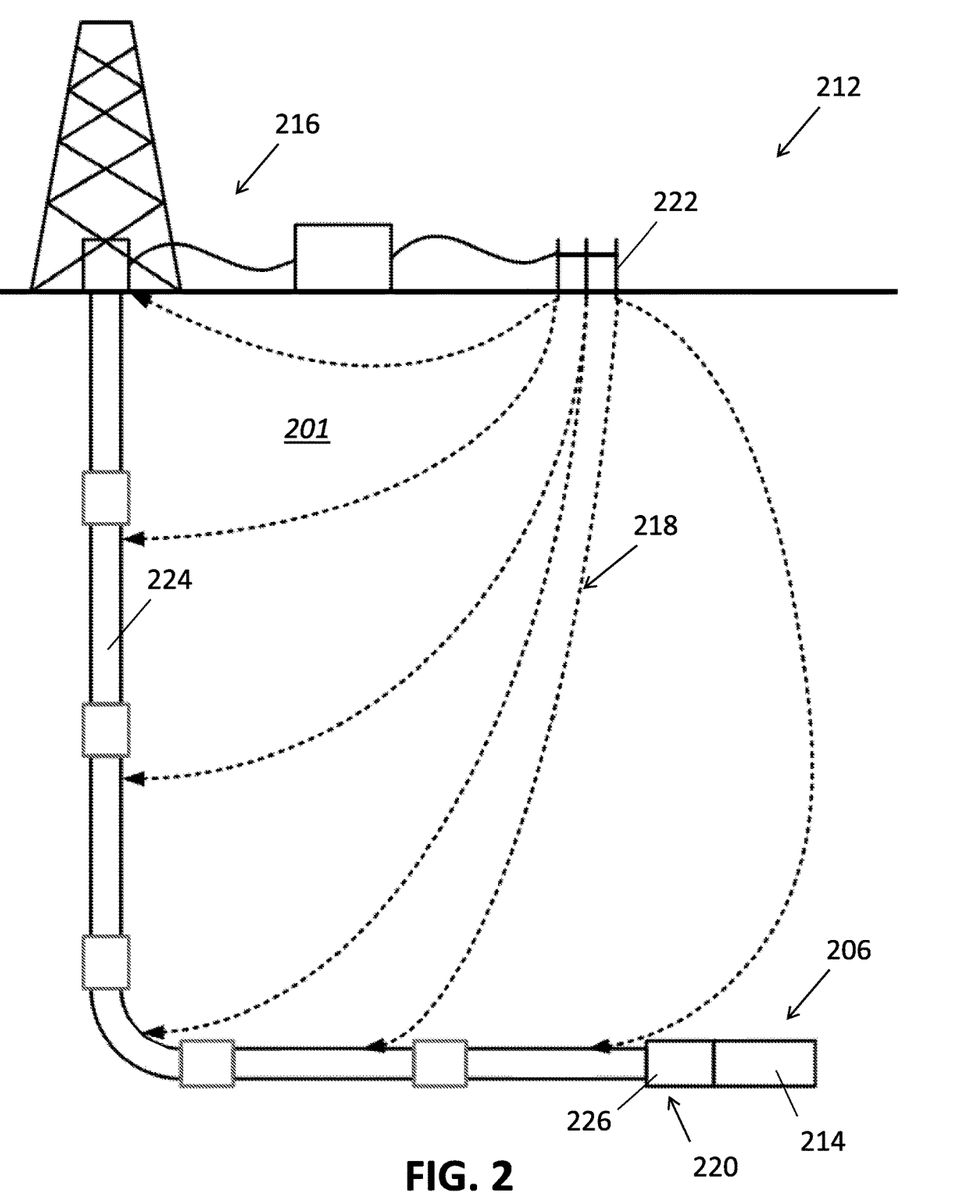
FIG. 2 is a representation of an electromagnetic downlink communication system, according to at least one embodiment of the present disclosure.

FIG. 2 is a schematic representation of a downhole drilling system 212, according to at least one embodiment of the present disclosure. The downhole drilling system 212 includes a BHA 206. The BHA 206 may include one or more downhole tools 214, such as drill bits, reamers, mills, casing cutters, other downhole tools, and combinations thereof. In some embodiments, the BHA 206 includes one or more measuring while drilling (MWD) and/or logging while drilling (LWD) tools. The MWD and/or the LWD may include one or more sensors used to measure borehole and/or BHA properties.

In some embodiments, an operator at a surface location 216 may desire to communicate with the BHA 206. For example, the operator may desire to send instructions to one or more downhole tools 214 of the BHA 206. In some embodiments, these instructions may include directions for directional drilling, instructions for a sensor to perform a measurement, instructions to actuate an expandable tool, other downhole instructions, and combinations thereof.

To communicate with the BHA 206 from the surface, a signal 218 may be sent from the surface location 216 to a receiver 220 at the BHA 206. Communication methods may include one or more of mud pulse generation, wired electromagnetic communication, wireless electromagnetic communication (e.g., electromagnetic downlink), RFID tags sent through the drilling fluid, drop balls, other communication methods, and combinations thereof. In some embodiments, communication method may communicate at a high bit rate (e.g., greater than 1 bits per section, greater than 3 bits per section, greater than 5 bits per section, greater than 10 bits per section) without wired communication and/or a wired drill pipe. In other words, wireless downhole communication, including non-wired downhole communication, may communicate at a high bit rate.

In some embodiments, electromagnetic downlink to the BHA 206 may include one or more transmitters 222 on the surface (such as metal stakes driven into the ground). An electromagnetic signal 218 may be transmitted into the formation 201 through the transmitters 222. The electromagnetic signal 218 may travel through the formation 218. At least a portion of the electromagnetic signal 218 may be collected by a length of drill pipe 224 in a wellbore. The electromagnetic signal 218 may be transmitted by the length of drill pipe 224 to a gap sub 226 in the length of drill pipe. The gap sub 226 may be located anywhere along the length of drill pipe 226. For example, the gap sub 226 may be located at or near the BHA 206.

The gap sub 226 includes a section of insulating material separating two sections of drill pipe 224. The electric potential across the gap sub 226 may be measured. Because the electromagnetic signal 218 is transmitted along the length of the drill pipe 224, the electromagnetic signal 218 may be received at the gap sub 226 by recording the electric potential across the gap sub 226. The electromagnetic signal 218 may then be demodulated at the BHA 206 and the information encoded in the electromagnetic signal retrieved.

Figure 3:
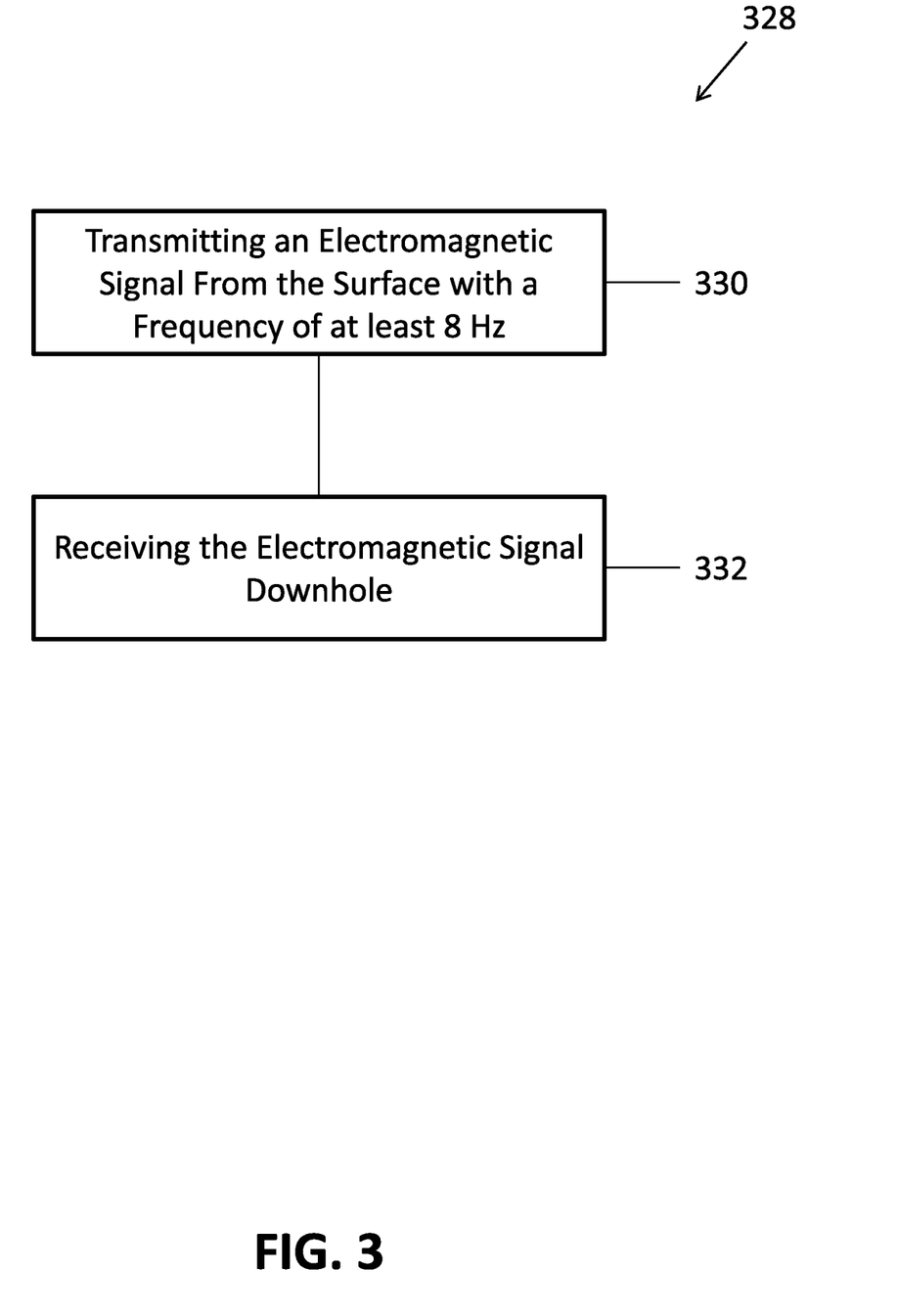
FIG. 3 is a representation of a method for downhole communication, according to at least one embodiment of the present disclosure.

FIG. 3 is a representation of a method 328 for downhole communication, according to at least one embodiment of the present disclosure. The method 328 may include transmitting an electromagnetic signal from the surface at 330. The electromagnetic signal may have a frequency of at least 8 Hz. In some embodiments, the electromagnetic signal may be transmitted using electromagnetic downlink communication. In some embodiments, the electromagnetic signal may be transmitted at a bit rate of greater than 1 bps, 2 bps, 3 bps, 4 bps, 5 bps, 6 bps, 7 bps, 8 bps, or greater.

The method 328 may include receiving the electromagnetic signal at a downhole tool at 332. The electromagnetic signal may be received at any portion of a downhole tool, such as at a bottomhole assembly (BHA). For example, the electromagnetic signal may be received at an MWD, an LWD, an RSS, or any other downhole tool.

In some embodiments, transmitting the electromagnetic signal may include transmitting instructions to one or more downhole tools. The method 328 may further include receiving the instructions. The method 328 may include changing at least one drilling parameter based on the instructions. For example, the instructions may include instructions to perform a measurement, actuate a downhole tool, change a trajectory of a bit, any other instructions, and combinations thereof. For example, downhole measurements may include azimuth, inclination, torque, pad force, force on the bit, pressure, gamma ray, chemical, mud velocity, vibration, other measurements, and combinations thereof. In some embodiments, the instructions may include instructions to actuate a downhole tool, such as an expandable tool. Expandable tools may include reamers, stabilizers, casing cutters, section mills, other expandable tools, and combinations thereof. In some embodiments, any actuatable downhole tool may be actuated by instructions from the electromagnetic signal, including rotary steering systems, mud motors, MWDs, LWDs, other downhole tools, and combinations thereof.

In some embodiments, the method 328 may include demodulating the electromagnetic signal at the BHA and/or the downhole tool. Demodulating the electromagnetic signal may include filtering noise from the electromagnetic signal.

In some embodiments, transmitting the electromagnetic signal at 330 may include transmitting a plurality of electromagnetic signals at a plurality of different frequencies. This may allow for a greater amount of information to be communicated to the BHA.

Figure 4:
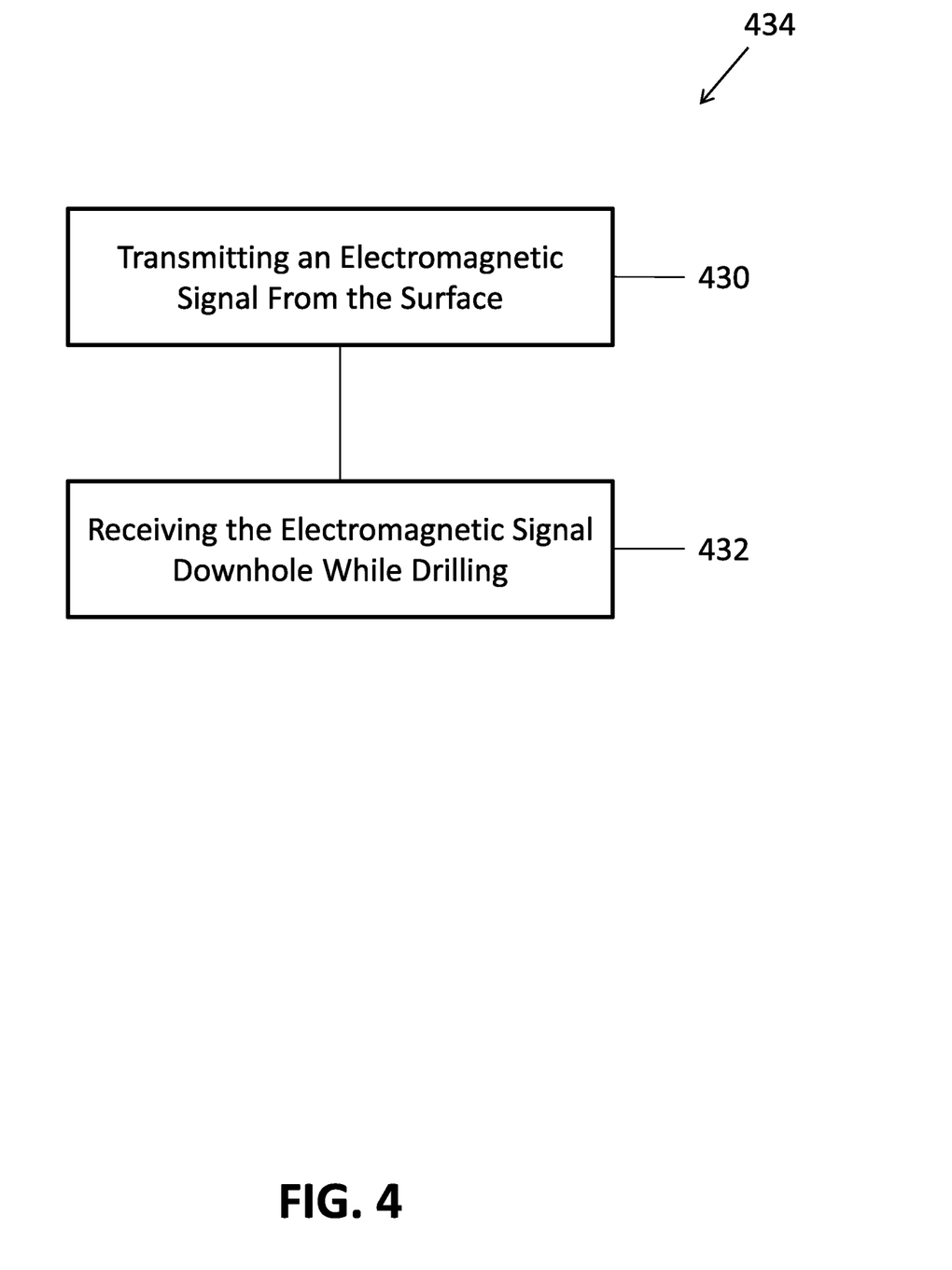
FIG. 4 is a representation of another method for downhole communication, according to at least one embodiment of the present disclosure.

FIG. 4 is a representation of a method 434 for downhole communication, according to at least one embodiment of the present disclosure. The method 434 may include transmitting an electronic signal from the surface at 430. The method 434 may include receiving the electromagnetic signal downhole at a BHA while drilling. In some embodiments, the drilling system may drill using an oil-based drilling fluid, such as oil-based mud. In some embodiments, the drilling system may drill using a water-based drilling fluid, such as water-based mud.

In some embodiments, transmitting the electromagnetic signal at 430 may include transmitting instructions for the BHA. For example, the instructions may include instructions to perform a measurement, actuate a downhole tool, change a trajectory of a bit, any other instructions, and combinations thereof. In some embodiments, the method 434 may further include changing at least one drilling parameter of the bottomhole assembly based on the transmitted instructions at 432.

In some embodiments, receiving the electromagnetic signal may include receiving the electromagnetic signal at a rotary steerable system (RSS). Receiving the electromagnetic signal at an RSS may allow an operator on the surface to quickly provide information and/or instructions to the RSS.

In some embodiments, transmitting the electromagnetic signal includes transmitting the electromagnetic signal without interrupting drilling activities. For example, the electromagnetic signal may be transmitted without shutting down pumps (e.g., while maintaining a volumetric flow rate of a drilling fluid). In some examples, the electromagnetic signal may be transmitted while rotating one or more downhole components.

Figure 5:
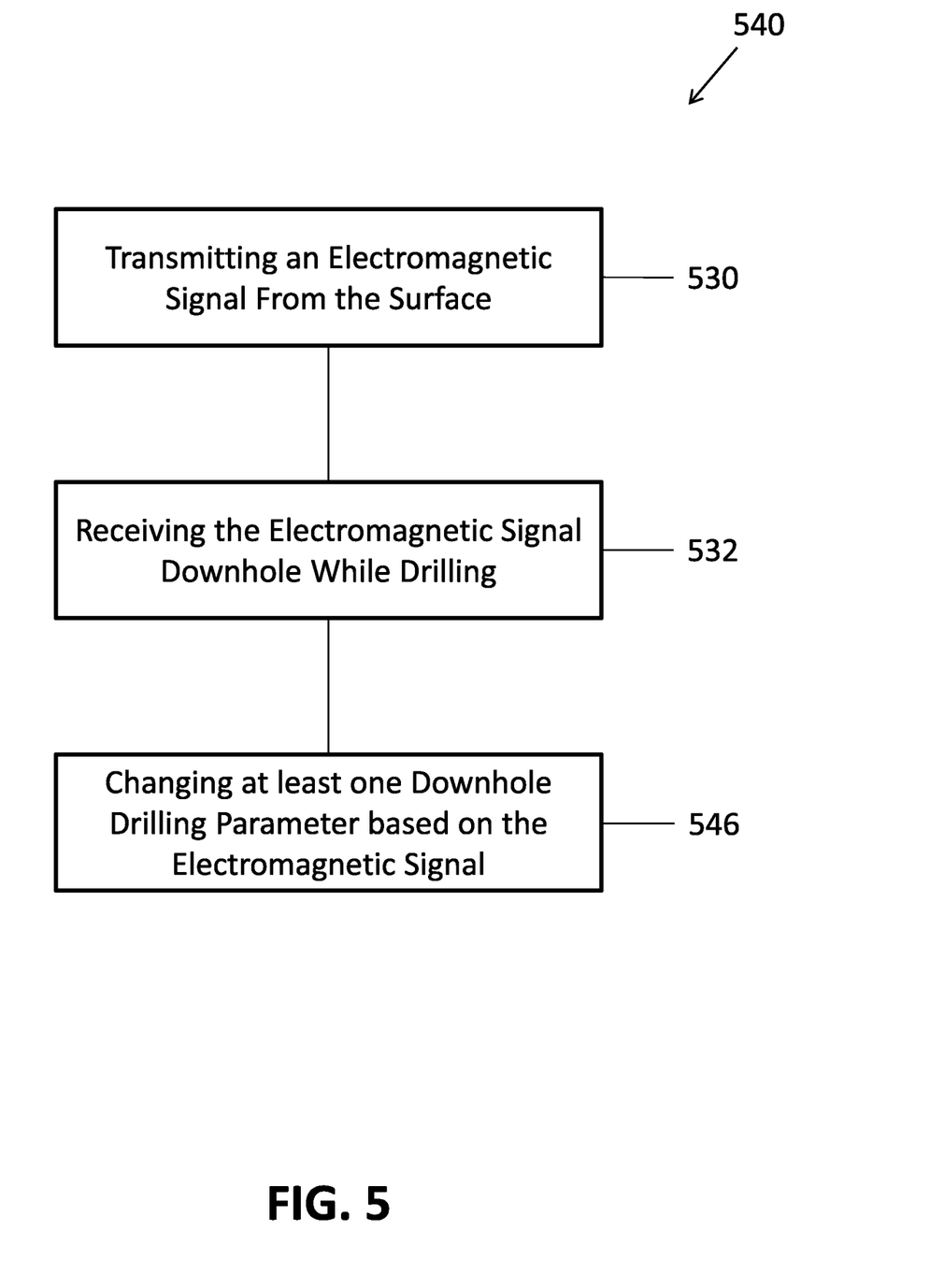
FIG. 5 is a representation of yet another method for downhole communication, according to at least one embodiment of the present disclosure.

FIG. 5 is a representation of a method 540 for downhole communication, according to at least one embodiment of the present disclosure. The method 540 may include transmitting an electromagnetic signal from the surface at 530. The method 540 may further include receiving the electromagnetic signal downhole while drilling at 532. In some embodiments, the method 540 may include changing at least one drilling parameter based on the electromagnetic signal (e.g., due to information and/or instructions included in the electromagnetic signal) at 546. For example, the downhole drilling parameter may include a measurement, actuation of a downhole tool, change in the trajectory of a bit, any other drilling parameter, and combinations thereof.

Changing a downhole measurement may include changing when a measurement is measured. For example, trajectory information (e.g., azimuth and inclination) measurement frequency may be increased when a dogleg is commenced. In some examples, the measurement may be measured as soon as the instruction from the surface is received, or at a time specified in the instruction. For example, the electromagnetic signal may include an instruction to take a survey measurement, such as gamma ray or other survey measurement, and the downhole tool may take the measurement when the instruction is received, or at the time specified. In some embodiments, the instructions may be stored in a memory on the BHA. The measurement may be stored on the BHA, and the measurement transmitted to the surface via mud pulse telemetry or other communication mechanism.

Figure 6:
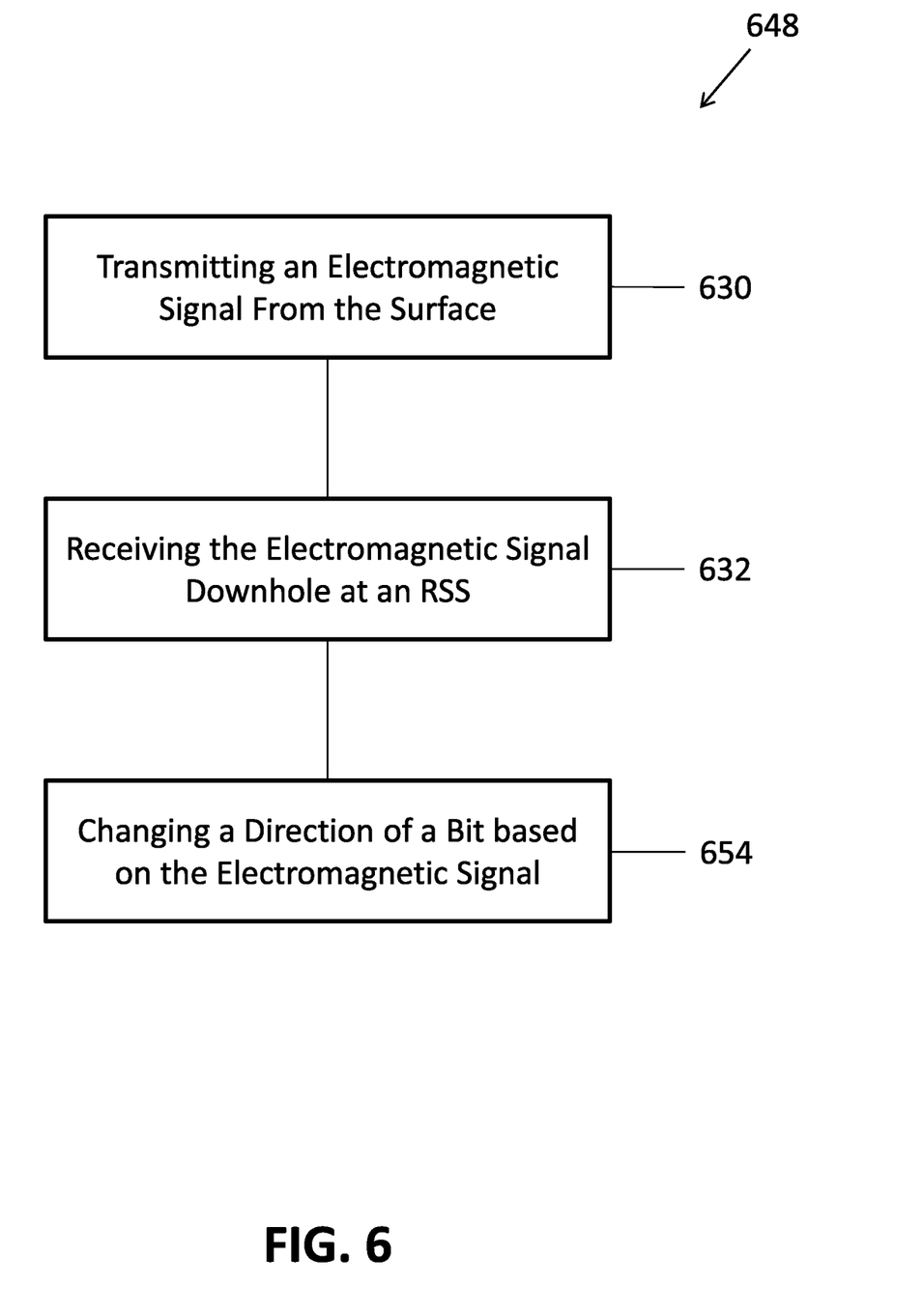
FIG. 6 is a representation of still another method for downhole communication, according to at least one embodiment of the present disclosure.

FIG. 6 is a representation of a method 648 for downhole communication, according to at least one embodiment of the present disclosure. The method 648 may include transmitting an electromagnetic signal from the surface at 630. The method 648 may include receiving the electromagnetic signal downhole at an RSS at 632. In some embodiments, the electromagnetic signal may include information, such as survey information, trajectory information, formation information, any other information, and combinations thereof. For example, the electromagnetic signal may include a target wellbore path. In some examples, the electromagnetic signal may include survey information, such as formation geology information (e.g., hardness, chemical makeup). In some embodiments, the method 648 includes changing a direction of a bit based on the information in the electromagnetic signal at 654. For example, based on new wellbore path information, the downhole tool may change the trajectory of the wellbore to match the received wellbore path information. In some examples, the survey information may indicate a target formation for the bit to stay within. The downhole tool may then change the trajectory of the bit to stay within the formation. In this manner, the electromagnetic signal may control the RSS and/or the direction of the bit.

Figure 7:
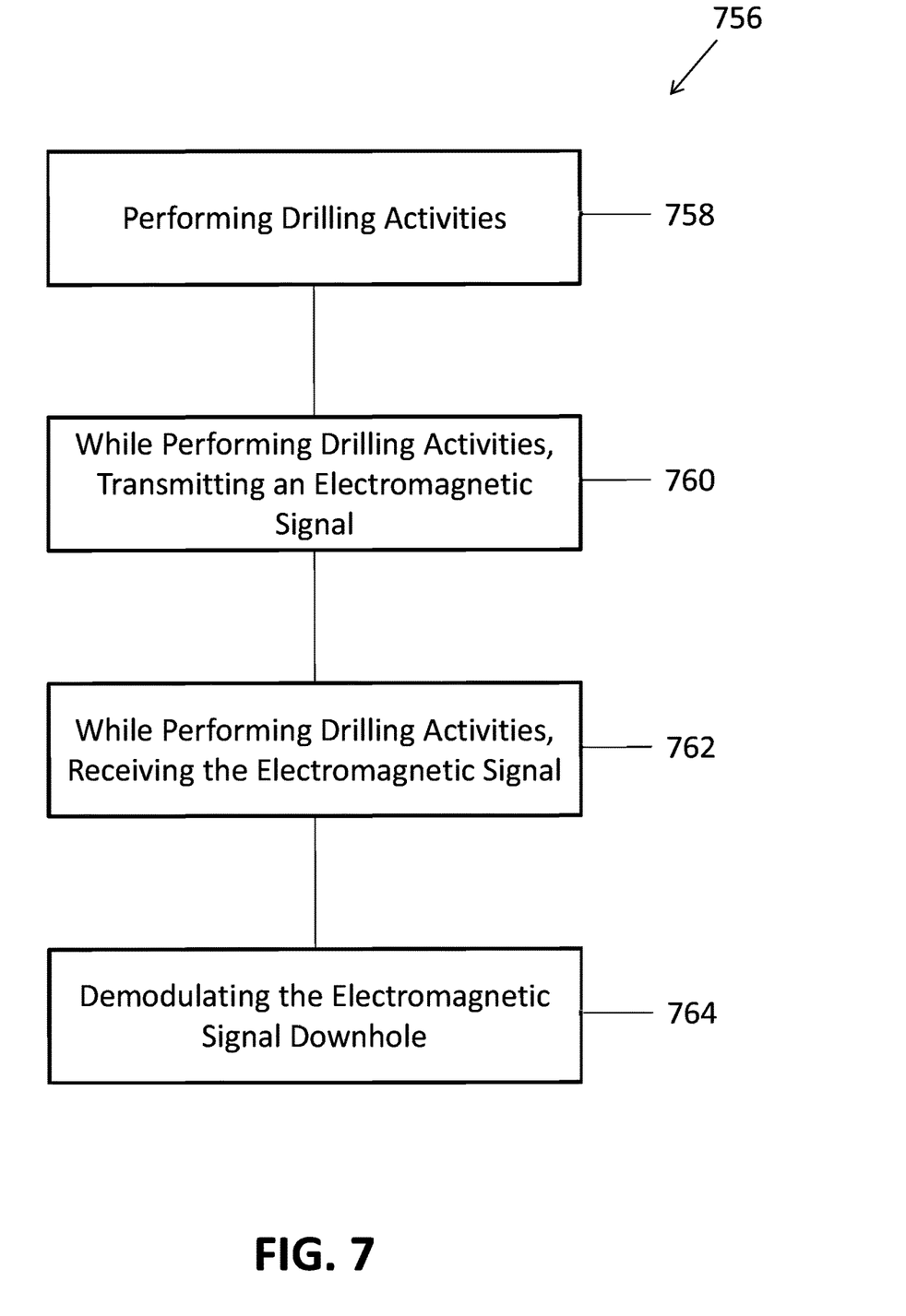
FIG. 7 is a representation of a further method for downhole communication, according to at least one embodiment of the present disclosure.

FIG. 7 is a representation of a method 756 for downhole communication, according to at least one embodiment of the present disclosure. The method 756 may include performing drilling activities at 758. Performing drilling activities may include drilling, reaming, milling, rotating one or more downhole components, tripping in/out of the wellbore, pumping drilling fluid, taking a measurement using a sensor, actuating a downhole tool (e.g., expanding an expandable tool), steering a bit, operating a downhole motor, operating a mud pulse generator, any other downhole activity, and combinations thereof. In some embodiments, the method 756 includes, while performing drilling activities, transmitting an electromagnetic signal from a surface location to a BHA at 760.

The method 756 may further include, while performing drilling activities, receiving the electromagnetic signal at the BHA at 762. In some embodiments, the method 756 may further include demodulating the electromagnetic signal downhole at 764. In other words, the electromagnetic signal may be decoded and the information therein retrieved for processing. The demodulating may occur during drilling activities. For example, the demodulating may occur while downhole tool is rotating. In some examples, the demodulating may occur while the downhole tool is eroding the formation. In some examples, the demodulating may occur while the pumps are running. In some embodiments, demodulating the electromagnetic signal may include demodulating the electromagnetic signal with a signal-to-noise ratio of greater than 10 dB.

INDUSTRIAL APPLICABILITY

This disclosure generally relates to devices, systems, and methods for electromagnetic downlink while drilling communication in drilling systems. Downhole drilling systems include at least one bottomhole assembly (BHA). The BHA may include one or more downhole tools, such as drill bits, reamers, mills, casing cutters, other downhole tools, and combinations thereof. In some embodiments, the BHA includes one or more measuring while drilling (MWD) and/or logging while drilling (LWD) tools. The MWD and/or the LWD may include one or more sensors used to measure borehole and/or BHA properties. In some embodiments, the BHA includes a rotary steerable system (RSS). The RSS may include an independently rotating portion that remains geostationary relative to an outside reference, such as true north, magnetic north, the force of gravity, and so forth. The geostationary reference may allow the RSS to provide steering instructions to the BHA, such as timing of steering pad actuation.

In some embodiments, an operator on the surface may desire to communicate with the BHA. For example, the operator may desire to send instructions to one or more downhole tools of the BHA. In some embodiments, these instructions may include directions for directional drilling, instructions for a sensor to perform a measurement, instructions to actuate an expandable tool, other downhole instructions, and combinations thereof.

To communicate with the BHA from the surface, a signal may be sent from the surface to a receiver at the BHA. Communication methods may include one or more of mud pulse generation, wired electromagnetic communication, wireless electromagnetic communication, RFID tags send through the drilling fluid, drop balls, other communication methods, and combinations thereof.

In some embodiments, downhole communication may interrupt downhole drilling activities. For example, downhole communication may interrupt rotation of a drilling tool (e.g., bit, reamer, mill and so forth). This may reduce the efficiency of downhole drilling operations and/or increase wear on downhole components, which may reduce the rate of penetration and increase costs. In some examples, mud pulse generation and other drilling fluid dependent communication (e.g., RFID tags, drop balls) may disrupt drilling operations. For example, drilling fluid dependent communication may interrupt the flow of drilling fluid to the BHA. This may reduce the efficiency of downhole drilling operations and/or increase wear on downhole components, which may reduce the rate of penetration and increase costs.

In some embodiments, electromagnetic downlink to the BHA may include one or more transmitters on the surface (such as metal stakes driven into the ground). An electromagnetic signal may be transmitted into the formation through the transmitters. The electromagnetic signal may travel through the formation. At least a portion of the electromagnetic signal may be collected by a length of drill pipe in a wellbore. The electromagnetic signal may be transmitted by the length of drill pipe to a gap sub in the length of drill pipe. The gap sub may be located anywhere along the length of the drill pipe. For example, the gap sub may be located at or near the BHA.

The gap sub includes a section of insulating material separating two sections of drill pipe. The electric potential across the gap sub may be measured. Because the electromagnetic signal is transmitted along the length of the drill pipe, the electromagnetic signal may be received at the gap sub by recording the electric potential across the gap sub. The electromagnetic signal may then be demodulated at the BHA.

In some embodiments, the length of drill pipe picks up other electromagnetic waves. For example, motion of the drill pipe may cause the length of drill pipe to pick up eddy currents caused by the interaction between the drill pipe and the earth's magnetic field. These other electromagnetic waves may be considered "noise," or undesirable or unintelligible electromagnetic patterns. In some embodiments, the noise may be greater during drilling operations, or when portions of the drill pipe are operating and/or moving.

The intensity of the electromagnetic signal compared to the noise may be the signal-to-noise ratio. A signal-to-noise ratio of greater than 1:1 may indicate that the signal is stronger than the noise, and therefore that the signal may be decoded from the noise. A greater signal-to-noise ratio may result in clearer and/or more reliable communication.

Conventionally, to increase the signal-to-noise ratio, electromagnetic downlink communication is performed while drilling operations are halted. This may reduce the amount of noise picked up by the length of drill pipe. By reducing the amount of noise, the signal-to-noise ratio is increased. Furthermore, conventionally, electromagnetic downlink communication is performed at frequencies of 7 Hz and lower. This may be, at least in part, because conventional interpretation of electromagnetic downlink communication indicates that the formation acts as a low-pass filter. If the formation is a low-pass filter, according to the conventional interpretation, then low frequency signals (e.g., signals 7 Hz and less) may transmit through the formation, and high frequency signals (e.g., signals 8 Hz and above) may be filtered out by the formation. Thus, according to the conventional interpretation, for the signal to even reach the length of drill pipe, the signal may be transmitted at a frequency of 7 Hz or less.

In some embodiments, using an oil-based drilling fluid may increase the transmissibility of high frequency signals. This may be because, once the electromagnetic signals are received by the length of drill pipe, the oil-based drilling fluid may act as insulation for the drill pipe. Thus, the electromagnetic signal may be received by the length of drill pipe and then transmitted along at least a portion of the length of drill pipe to the gap sub, the electromagnetic signal being insulated by the oil-based drilling fluid. In some embodiments, the oil-based drilling fluid may provide insulation against leaking of the electromagnetic signal from the drill pipe to the formation and/or from the length of drill pipe picking up noise. Thus, in some embodiments, the transmission frequency may be greater than 8 Hz, 9 Hz, 10 Hz, 15 Hz, 20 Hz, 25 Hz, 30 Hz, 40 Hz, 50 Hz, 75 Hz, 100 Hz, 150 Hz, 200 Hz, or at a higher frequency.

In some embodiments, the intensity of the noise may be lower at high frequencies (e.g., frequencies of at least 8 Hz) than at low frequencies (e.g., frequencies of 7 Hz or less). Thus, in some embodiments, by transmitting electromagnetic signals at high frequencies, the signal-to-noise ratio may be increased because the noise is decreased. In some embodiments, the noise at the gap sub may be reduced sufficiently for electromagnetic downlink communication to be performed during drilling operations.

In some embodiments, the signal-to-noise ratio may be in a range having an upper value, a lower value, or upper and lower values including any of 10 dB, 12 dB, 14 dB, 16 dB, 18 dB, 20 dB, 22 dB, 24 dB, 26 dB, 28 dB, 30 dB, or any value therebetween. For example, the signal-to-noise ratio may be greater than 10 dB. In another example, the signal-to-noise ratio may be less than 30 dB. In yet other examples, the signal-to-noise ratio may be any value in a range between 10 dB and 30 dB. In some embodiments, it may be critical that the signal-to-noise ratio is greater than 10 dB to ensure that the signal may be decoded.

In some embodiments, by transmitting at high frequencies, electromagnetic downlink communication may be performed while drilling operations are being performed. In other words, electromagnetic downlink may be performed without interrupting drilling activities or operations. For example, electromagnetic downlink may be performed while the pumps are pumping drilling fluid without varying the change in volumetric flow rate. In some examples, electromagnetic downlink may be performed while tripping drill pipe in or out of the wellbore. In some examples, electromagnetic downlink may be performed while removing material, such as though drilling, reaming, milling, cutting casing, removing any other material, and combinations thereof. By not stopping drilling operations, the rate of penetration may be increased, wear on downhole equipment may be reduced (e.g., by preventing stop-start cycles), costs may be reduced, and combinations of the foregoing.

In some embodiments, electromagnetic downlink communication may transmit information to the BHA at any depth. For example, electromagnetic downlink communication may transmit information to the BHA at depths of greater than 100 ft, 250 ft., 500 ft, 1,000 ft, 2,500 ft, 5,000 ft, 10,000 ft, 25,000 ft, and more. In this manner, electromagnetic downlink communication may be used at any stage of the life cycle of a wellbore.

In some embodiments, electromagnetic downlink communication may be a faster method of communication than other means of communication during drilling. For example, mud pulse telemetry may communicate with the BHA during drilling operations. However, as a result of the transmission medium (e.g., changes in fluid flow), mud pulses may be spaced apart to produce perceptible variations in the drilling fluid. This may limit the amount of information that may be transmitted in a time period. For example, a single communication or instruction to the BHA using conventional mud pulse telemetry may take between 20 and 30 minutes to transmit.

In contrast, electromagnetic downlink communication may transmit information quickly to the BHA. For example, electromagnetic downlink communication may transmit a single communication or instruction to the BHA in less than 30 seconds. This means that, during downhole drilling operations, an operator may transmit instructions to the BHA in response to current drilling conditions with a much shorter delay. For example, if an operator determines that the bit has strayed out of the formation, while the bit is drilling, the operator may provide azimuthal and/or inclination directional drilling instructions to the directional drilling system, and the bit may be redirected to the target trajectory. Because this process happens quicker, the borehole may more fully match a target trajectory, which may reduce costs and increase the effective rate of penetration.

In some embodiments, the electromagnetic downlink bit rate to the BHA may be in a range having an upper value, a lower value, or upper and lower values including any of 1 bit per second (bps), 2 bps, 3 bps, 4 bps, 5 bps, 6 bps, 7 bps, 8 bps, 9 bps, 10 bps, 12 bps, 14 bps, 16 bps, or any value therebetween. For example, the bit rate may be greater than 1 bps. In another example, the bit rate may be less than 16 bps. In yet other examples, the bit rate may be any value in a range between 1 bps and 16 bps. In some embodiments, the bit rate may be greater than 16 bps. In some embodiments, it may be critical that the bit rate is greater than 4 bps to provide sufficiently fast communication with the BHA.

In some embodiments, the electromagnetic signal is received with a receiver. In some embodiments, the receiver is located at the gap sub. In some embodiments, the receiver is located at the MWD. In other words, the electromagnetic downlink communicates with the MWD. In this manner, the electromagnetic signal may include instructions for tools in the MWD, such as instructions for a measurement using a sensor, instructions to actuate a downhole tool, instructions to deactuate a downhole tool, directional drilling instructions, other instructions, and combinations thereof. In some embodiments, the receiver may be located at another downhole tool. For example, the receiver may be located at the RSS. The electromagnetic signals may include directional drilling instructions. In this manner, the operator may quickly provide instructions to change the trajectory of the wellbore while drilling. This may increase the responsiveness of the downhole drilling system, which may improve the rate of penetration and/or decrease costs.

In some embodiments, a method for downhole communication includes transmitting an electromagnetic signal from the surface. The electromagnetic signal may have a frequency of at least 8 Hz. In some embodiments, the electromagnetic signal may be transmitted using electromagnetic downlink communication. In some embodiments, the electromagnetic signal may be transmitted at a bit rate of greater than 1 bps, 2 bps, 3 bps, 4 bps, 5 bps, 6 bps, 7 bps, 8 bps, or greater.

The method may include receiving the electromagnetic signal at a downhole tool. The electromagnetic signal may be received at any portion of a downhole tool, such as at a bottomhole assembly (BHA). For example, the electromagnetic signal may be received at an MWD, an LWD, an RSS, or any other downhole tool.

In some embodiments, transmitting the electromagnetic signal may include transmitting instructions to one or more downhole tools. The method may further include receiving the instructions. The method may include changing at least one drilling parameter based on the instructions. For example, the instructions may include instructions to perform a measurement, actuate a downhole tool, change a trajectory of a bit, any other instructions, and combinations thereof.

In some embodiments, the method may include demodulating the electromagnetic signal at the BHA and/or the downhole tool. Demodulating the electromagnetic signal may include filtering noise from the electromagnetic signal.

In some embodiments, transmitting the electromagnetic signal may include transmitting a plurality of electromagnetic signals at a plurality of different frequencies. This may allow for a greater amount of information to be communicated to the BHA.

In some embodiments, a method for downhole communication may include transmitting an electronic signal from the surface. The method may include receiving the electromagnetic signal downhole at a BHA while drilling. In some embodiments, the drilling system may drill using an oil-based drilling fluid, such as oil-based mud. In some embodiments, the drilling system may drill using a water-based drilling fluid, such as water-based mud.

In some embodiments, transmitting the electromagnetic signal may include transmitting instructions for the BHA. For example, the instructions may include instructions to perform a measurement, actuate a downhole tool, change a trajectory of a bit, any other instructions, and combinations thereof. In some embodiments, the method may further include changing at least one drilling parameter of the bottomhole assembly based on the transmitted instructions.

In some embodiments, receiving the electromagnetic signal may include receiving the electromagnetic signal at a rotary steerable system (RSS). Receiving the electromagnetic signal at an RSS may allow an operator on the surface to quickly provide information and/or instructions to the RSS.

In some embodiments, transmitting the electromagnetic signal includes transmitting the electromagnetic signal without interrupting drilling activities. For example, the electromagnetic signal may be transmitted without shutting down pumps (e.g., while maintaining a volumetric flow rate of a drilling fluid). In some examples, the electromagnetic signal may be transmitted while rotating one or more downhole components.

In some embodiments, a method for downhole communication includes transmitting an electromagnetic signal from the surface. The method may include receiving the electromagnetic signal downhole at an RSS. In some embodiments, the electromagnetic signal may include information, such as survey information, trajectory information, formation information, downhole tool maintenance information, any other information, and combinations thereof. In some embodiments, the method includes changing a direction of a bit based on the information in the electromagnetic signal. In this manner, the electromagnetic signal may control the RSS and/or the direction of the bit.

In some embodiments, a method for downhole communication includes performing drilling activities. Performing drilling activities may include drilling, reaming, milling, rotating one or more downhole components, tripping in/out of the wellbore, pumping drilling fluid, taking a measurement using a sensor, actuating a downhole tool (e.g., expanding an expandable tool), steering a bit, operating a downhole motor, operating a mud pulse generator, any other downhole activity, and combinations thereof. In some embodiments, the method includes, while performing drilling activities, transmitting an electromagnetic signal from a surface location to a BHA.

The method may further include, while performing drilling activities, receiving the electromagnetic signal at the BHA. In some embodiments, the method may further include demodulating the electromagnetic signal downhole. In other words, the electromagnetic signal may be decoded and the information therein retrieved for processing. In some embodiments, demodulating the electromagnetic signal may include demodulating the electromagnetic signal with a signal-to-noise ratio of greater than 10 db.

The embodiments of electromagnetic downlink while drilling have been primarily described with reference to wellbore drilling operations; the electromagnetic downlink while drilling described herein may be used in applications other than the drilling of a wellbore. In other embodiments, electromagnetic downlink while drilling according to the present disclosure may be used outside a wellbore or other downhole environment used for the exploration or production of natural resources. For instance, electromagnetic downlink while drilling of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for downhole communication, comprising:
   Providing an oil-based fluid to a bottomhole assembly;
   selecting a frequency of at least 8 Hz for an electromagnetic signal based, in part, on the oil-based fluid;
   transmitting the electromagnetic signal from a surface location without interrupting downhole drilling activities, wherein the downhole drilling activities comprise removing material from a wellbore;
   receiving the electromagnetic signal downhole at a bottomhole assembly while performing the downhole drilling activities; and
   demodulating the electromagnetic signal at the bottomhole assembly while performing the downhole drilling activities.

2. The method of claim 1, wherein transmitting the electromagnetic signal includes transmitting instructions for the bottomhole assembly or transmitting information to the bottomhole assembly.

3. The method of claim 2, comprising changing at least one drilling parameter of the bottomhole assembly based on the transmitted instructions.

4. The method of claim 1, wherein receiving the electromagnetic signal includes receiving the electromagnetic signal at a rotary steerable system of the bottomhole assembly.

5. The method of claim 1, wherein the downhole drilling activities comprise drilling formation of the wellbore, reaming formation of the wellbore, or cutting casing of the wellbore.

6. The method of claim 1, wherein transmitting the electromagnetic signal includes transmitting the electromagnetic signal while maintaining a volumetric flow rate of a drilling fluid.

7. A method for downhole communication, comprising:
providing an oil-based fluid to a bottomhole assembly;
selecting a frequency of at least 8 Hz for an electromagnetic signal based in part on the oil-based fluid;
transmitting the electromagnetic signal from a surface location; and
receiving the electromagnetic signal downhole at an uphole location of a length of drill pipe of the bottomhole assembly;
insulating the length of drill pipe of the bottomhole assembly from the formation with the oil-based fluid; and
transmitting the electromagnetic signal to a gap sub of the bottomhole assembly.

8. The method of claim 7, wherein transmitting the electromagnetic signal includes transmitting at a bit rate of greater than 1 bit per second.

9. The method of claim 8, wherein transmitting the electromagnetic signal includes transmitting at a bit rate of greater than 8 bits per second.

10. The method of claim 7, wherein transmitting the electromagnetic signal includes transmitting instructions for the bottomhole assembly.

11. The method of claim 10, comprising receiving the instructions and changing at least one drilling parameter of the bottomhole assembly.

12. The method of claim 7, comprising demodulating the electromagnetic signal.

13. The method of claim 12, wherein demodulating the electromagnetic signal includes filtering noise from the electromagnetic signal.

14. The method of claim 7, wherein transmitting the electromagnetic signal includes transmitting a plurality of electromagnetic signals at a plurality of frequencies.

15. A method for downhole communication, comprising:
performing drilling activities comprising drilling, reaming, or milling using an oil-based fluid;
selecting a frequency of at least 8 Hz for an electromagnetic signal based, in part, on the oil-based fluid
while performing the drilling activities, transmitting the electromagnetic signal from a surface location to a bottomhole assembly;
while performing the drilling activities, receiving the electromagnetic signal downhole at the bottomhole assembly; and
demodulating the electromagnetic signal at the bottomhole assembly.

16. The method of claim 15, wherein transmitting the electromagnetic signal includes transmitting at a frequency of greater than 8 Hz.

17. The method of claim 15, wherein performing the drilling activities includes tripping drill pipe into a wellbore or tripping drill pipe out of the wellbore.

18. The method of claim 15, wherein demodulating the electromagnetic signal includes demodulating the electromagnetic signal with a signal-to-noise ratio of greater than 1:1.

* * * * *